United States Patent [19]

Mörner et al.

[11] Patent Number: 4,560,040
[45] Date of Patent: Dec. 24, 1985

[54] BRAKE DEVICE FOR BRAKING THE SAW CHAIN OF A PORTABLE MOTOR-DRIVEN CHAIN SAW

[75] Inventors: Bengt Mörner, Hoväs, Sweden; Otto Vollertsen, Hamburg; Peter Thomsen, Quickborn, both of Fed. Rep. of Germany

[73] Assignee: Sachs-Dolmar GmbH, Hamburg, Fed. Rep. of Germany

[21] Appl. No.: 458,971

[22] Filed: Apr. 25, 1983

[30] Foreign Application Priority Data

Jan. 18, 1982 [DE] Fed. Rep. of Germany ....... 3201277
Sep. 3, 1982 [DE] Fed. Rep. of Germany ....... 3232775

[51] Int. Cl.$^4$ .............................................. F16D 49/10
[52] U.S. Cl. .................................. 188/77 R; 30/381; 188/110; 188/139; 188/166; 192/89 A
[58] Field of Search ............... 188/110, 77 R, 166, 188/174, 135, 139; 30/381, 382; 192/89 A, 89 W

[56] References Cited

U.S. PATENT DOCUMENTS

| 596,514 | 1/1898 | Ihlder | 188/171 |
|---|---|---|---|
| 1,347,347 | 7/1920 | MacKintosh | 188/77 R |
| 1,808,645 | 6/1931 | Faehrmann | 188/110 X |
| 2,291,816 | 8/1942 | Lear | 188/77 R |
| 2,807,427 | 9/1957 | Herrick | 188/77 R X |
| 3,295,780 | 1/1967 | Selsted et al. | 188/77 R X |
| 3,982,616 | 9/1976 | Bidanset | 192/103 C X |
| 4,057,900 | 11/1977 | Nagy et al. | 30/382 |
| 4,156,477 | 5/1979 | Nagashima et al. | 188/77 R |
| 4,324,045 | 4/1982 | Hoppner et al. | 30/381 |
| 4,420,885 | 12/1983 | Todero | 30/381 |
| 4,460,072 | 7/1984 | Morner et al. | 188/77 R |

FOREIGN PATENT DOCUMENTS

| 2217707 | 10/1972 | Fed. Rep. of Germany . |
|---|---|---|
| 2440483 | 3/1975 | Fed. Rep. of Germany . |
| 2459528 | 10/1975 | Fed. Rep. of Germany . |
| 2621812 | 12/1976 | Fed. Rep. of Germany . |
| 2602247 | 7/1977 | Fed. Rep. of Germany . |
| 2716448 | 10/1977 | Fed. Rep. of Germany . |
| 2831097 | 3/1979 | Fed. Rep. of Germany . |
| 3018952 | 11/1981 | Fed. Rep. of Germany . |

OTHER PUBLICATIONS

International Publication #WO80/00548–Publication Date: 3.4.80–based on International Application PCT/US79/00721 of 13.9.79.

Primary Examiner—George E. A. Halvosa
Attorney, Agent, or Firm—Toren, McGeady, Stanger, Goldberg & Kiel

[57] ABSTRACT

A braking device for braking the saw chain of a portable motor-driven chain saw having a safety device which has a mass member, a locking lever being provided which is pivotably mounted on the hand guard lever and bears the mass member at its free, sprung end, co-operating by its other end with a control cam which bears against the brake lever and via which the braking operation of the rotating saw chain is controlled, in such a way that the braking operation of the rotating saw chain is automatically initiated, if an uncontrolled acceleration takes place, by the saw rolling down the timber trunk to be sawn at the moment when the saw becomes jammed, with the consequence that the resulting braking force counteracts the accelerating force, so that the recoil angle of the saw is reduced.

6 Claims, 8 Drawing Figures

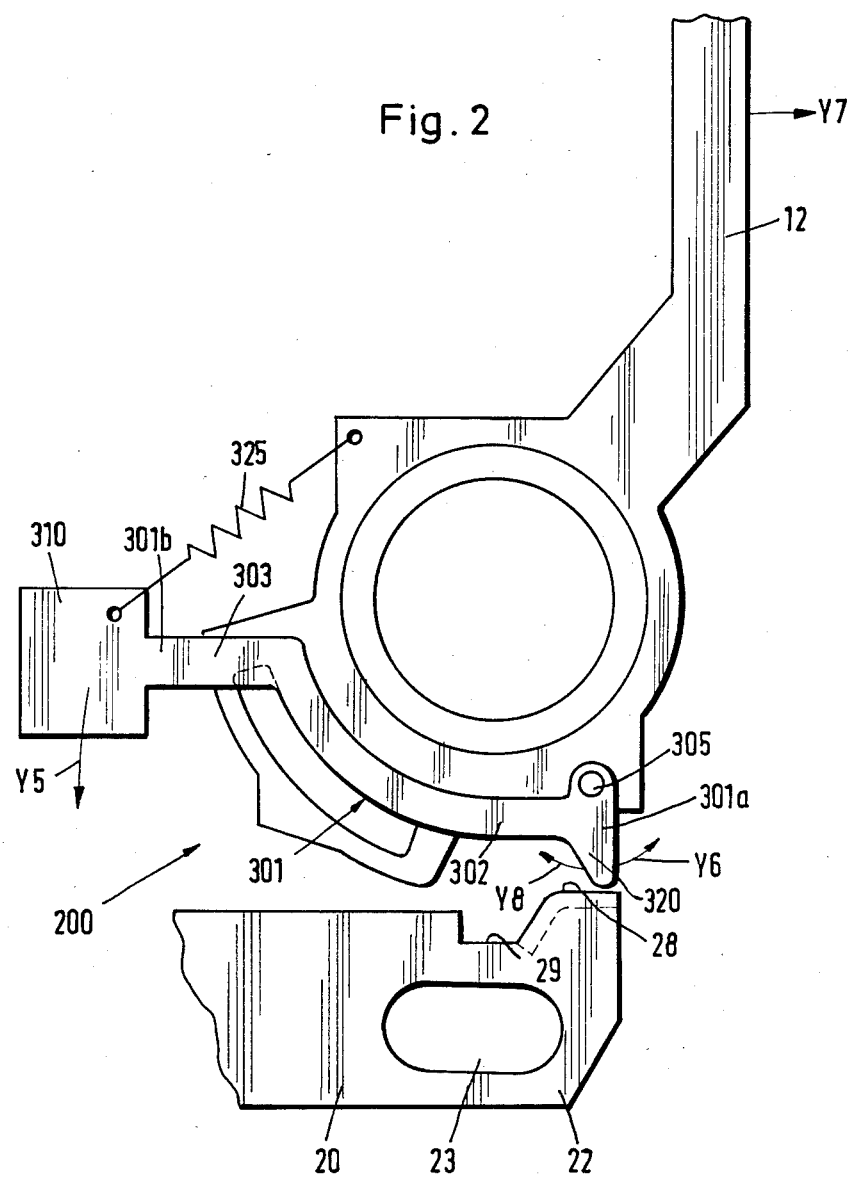

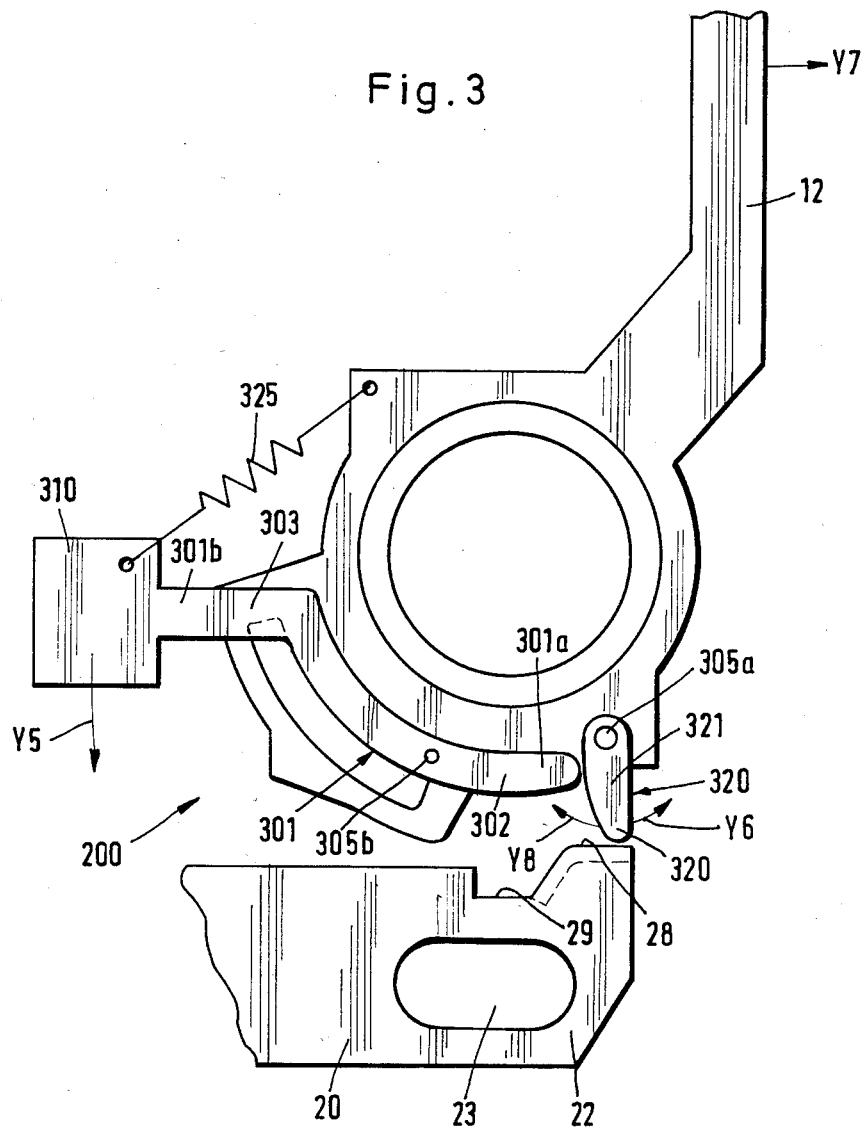

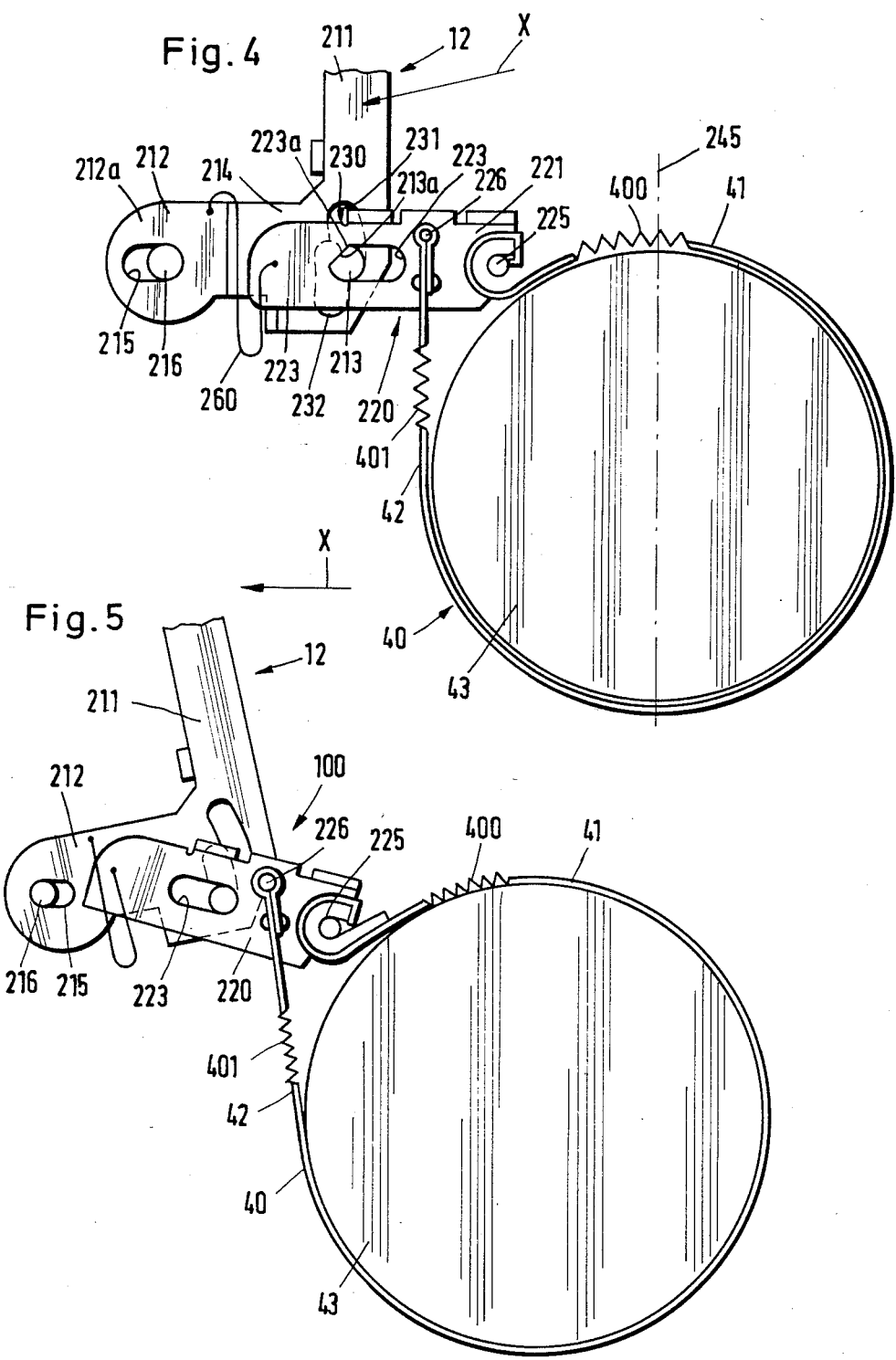

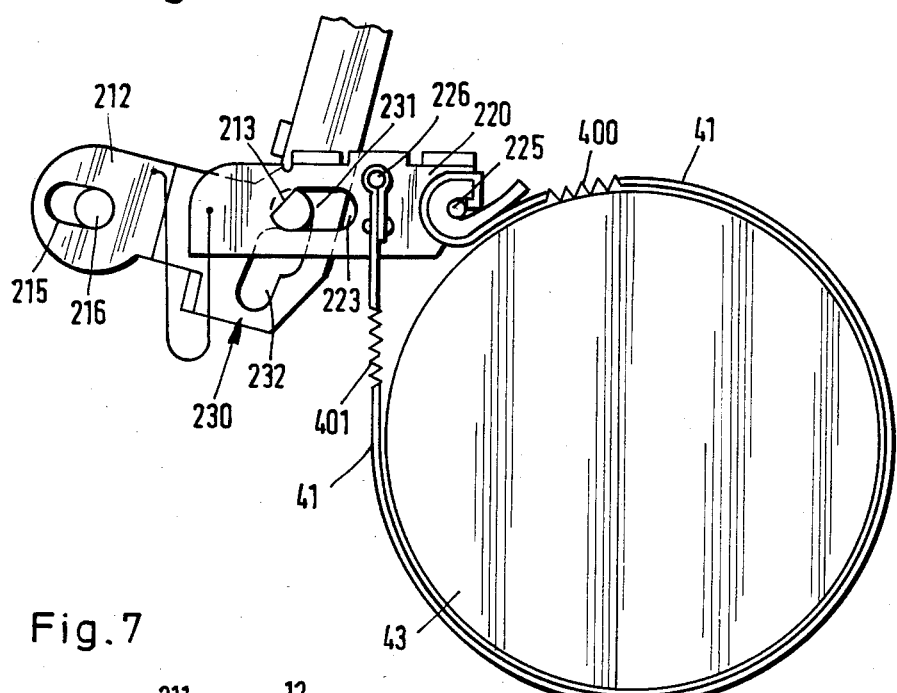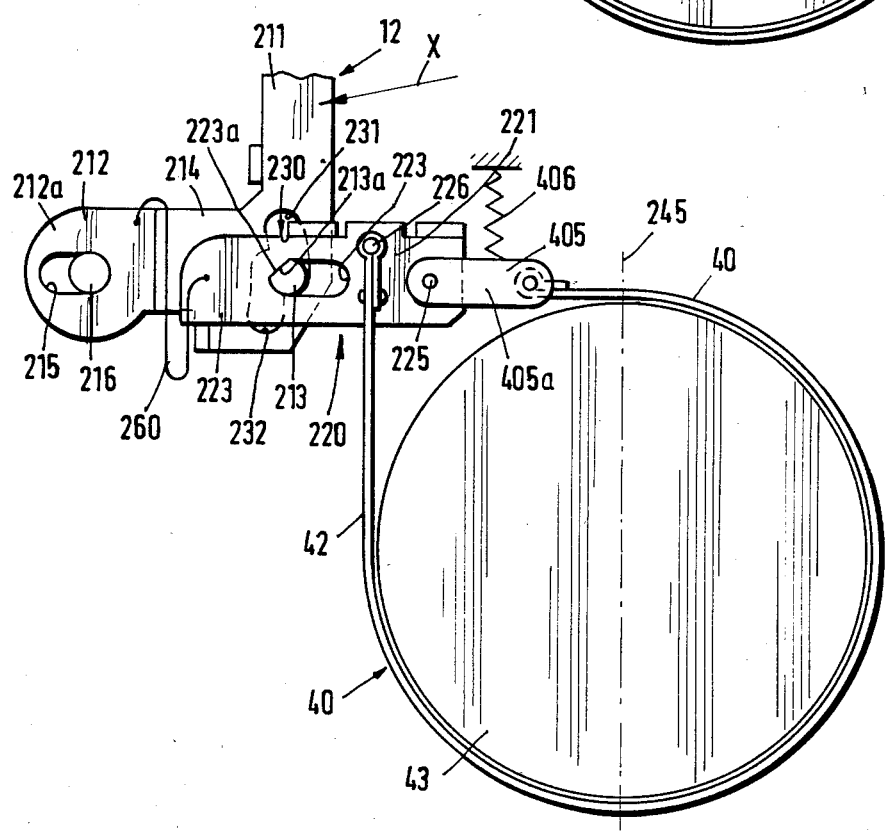

BRAKE DEVICE FOR BRAKING THE SAW CHAIN OF A PORTABLE MOTOR-DRIVEN CHAIN SAW

The invention relates to a brake device for braking the saw chain of a portable motor-driven chain saw, having a senser, which responds when a dangerous situation occurs, and is constructed in the form of a pivotable hand guard lever which is pivotably retained on the chain saw casing and can be brought into contact with the operator's hand if the saw makes a slipping movement and by whose movement it is possible to actuate a friction brake which is in operative connection with the hand guard lever and which acts on a drum connected to the driving chain wheel of the chain saw and has a safety device which, if an uncontrolled acceleration of the rotating saw chain takes place, actuates the friction band brake.

BACKGROUND OF THE INVENTION

Slipping movements can easily occur in portable motor-driven chain saws, if the part of the chain saw extending over the top side of the blade plate comes into contact with a solid object such as, for instance, a branch. If the saw is thrown upwards as a result it can injure the operator in the face or the upper part of the body if he or she releases the front, bowed handle of the saw. To prevent this, protective devices are already known which brake the chain if the saw suddenly makes a slipping movement. It is known to use latch-like triggering devices to trigger brake devices for braking the saw chain of a portable motor-driven chain saw.

For instance, a brake device for motor driven saws is known which has single-arm latch levers pivotably mounted on one side and connected to a tension spring and the brake band engaging around the drum of the driving chain wheel. In this brake device there is the disadvantage that relatively considerable forces must be exerted on the latch lever to unlatch the locking latch. This causes the risk of delayed response by the brake device, so that the operator is not adequately protected (German OS Nos. 22 17 707 and 24 40 483).

A brake device is also known in which a triggering bowed member is provided on which a cam is formed which can be brought into engagement with the stop of a sprung actuating member connected to the free end portion of the brake band. However, in this system vibrations and impacts, such as occur during normal sawing operation, are transmitted to the triggering bowed member and therefore easily release the connection to the actuating member. Precisely when sawing knotty timber or the like, the brake system an easily be triggered without a dangerous situation having arisen, so that a brake system constructed in that way contributes towards reducing the operator's performance (U.S. Pat. No. 3,982,616, German OS No. 24 59 528).

A brake system is also known which is expensive to construct, because it uses a two-armed lever. Moreover, pivoting movements of the saw blade, which occur even during normal sawing operation, are transmitted directly via the lever to the brake device, so that in this case also the brake device can respond without the operator being in danger (German OS No. 26 21 812).

In the construction disclosed in U.S. Pat. No. 3,934,345 the ends of the brake band are attached directly to the triggering lever.

PCT Patent Specification No. WO 80/00548 provides a type of articulation of the ends of the brake band by which the brake band is attached by one end to the triggering lever, its other end being attached to the machine casing.

The brake band is guided in a very complicated manner in German OS No. 28 31 097. In that prior art construction the brake band is attached at one end to the machine casing, the other end of the brake band being attached to the triggering lever after numerous deflections over pins and bolts.

In the brake device disclosed in German OS No. 26 02 247 one end of the brake band is attached to the machine casing, while the other end of the brake band is articulated to the free end of a sprung toggle lever actuable by the triggering lever via an adjusting member.

It is also known for the brake band to be attached at one end to the triggering lever, while the other end of the brake band is guided over a pin and then attached to the machine casing (German OS No. 27 16 448, U.S. Pat. No. 4,059,895), A chain saw brake device operating with a toggle joint is known from U.S. Pat. No. 4,077,125. In that brake device the triggering lever is connected via a sprung control rod to the two levers of the toggle joint, the free end of the actuating rod engaging with the joint connecting joint of the two levers. The band brake is tightened by moving the two levers of the toggle joint into an angular position on actuation of the triggering lever, although the band brake is not attached by its two ends directly to one of the two levers of the toggle joint.

All the known brake devices therefore share the feature that the brake band is attached by one end to the casing receiving the brake device as by the other end to the lever of an actuating device, and even in that embodiment is which a toggle joint is provided for actuating the band brake, the band brake ends are not directly connected to the toggle joint. There is also the fact that some of the known constructions of brake devices are of complicated construction.

In addition, motor-driven chain saw safety devices are known which have a mass member which responds to an acceleration force, and are operatively connected to a brake device. In such a safety device the mass member which triggers the brake device can be displaced from its inoperative position to deliver a pulse by acceleration forces operating in a single plane. The safety device comes into operation if uncontrolled acceleration forces occur, for instance, with upward jerks of the saw blade.

A motor-driven chain saw is also known which has a safety device having a mass member responding to acceleration force and operatively connected to a brake device, the mass member having at least one bearing part under a retaining force and being disposed as a monostable inertia switch displaceable thereby under the influence of the accelerating force. This safety device ensures that the mass member triggers, circularly on all sides, a contact for switching on the brake device (German OS No. 30 18 952).

PROBLEM

In contrast, the problem to which the invention relates is to provide a brake device with a safety device by means of which the braking operation of the rotating saw chain is initiated automatically, if an uncontrolled acceleration occurs, by the saw rolling down the timber trunk to be sawn, at the moment the saw becomes jammed, the resulting braking force counteracting the acceleration force, so that the recoil angle of the saw is reduced.

BRIEF SUMMARY OF THE INVENTION

To solve this problem, a brake device of the kind specified is proposed which according to the invention is so constructed that (a) the hand guard lever, pivotably mounted on the chain saw casing, is so connected via a lever-like device to a brake lever, at whose free end the two ends of the brake band are pivotably articulated at a distance from one another at certain places, that in the braking position, the brake lever can be moved by means of a device such as a compression spring into an angular position, while at the same time the two places of brake band articulation change their positions in relation to one another, and the brake band is applied to the brake drum;

(b) the safety device consists of a locking lever which is pivotably mounted on the hand guard lever and bears a mass member at its free sprung end; and (c) the locking lever bears at its end remote from the end bearing the mass member a control cam which bears against the brake lever and is so operatively connected thereto that the control cam can be transferred over a guideway of the brake lever into a recess therein to trigger the braking operation.

A brake device thus constructed on the one hand enables the friction brake to be actuated by contact between the hand guard lever, mounted on the chain saw casing, and the operator's hand if a dangerous situation arises, while on the other hand the safety device affords the possibility of initiating the braking operation if an uncontrolled acceleration suddenly occurs, independently by the triggering lever, which is triggered by the back of the operator's hand. This safety device therefore triggers the chain brake fully automatically by a delaying weight of an acceleration occurs. Such acceleration forces always occur when, for instance, in the operational condition of the saw the saw chain becomes jammed in the tree trunk to be sawn, with the consequence that the saw bar rolls down the trunk together with the saw chain, the result being an acceleration force which may result in a recoil of the saw, so that the operator is injured. The combination of such a safety device, by which the chain brake is triggered fully automatically by the delaying weight when sudden accelerations occur, and a brake device which can be actuated by the operator, ensures a high degree of safety to the operator, while moreover ensuring that the safety device cannot be automatically triggered by the vibrations and jerks occurring during normal saw operation. The operator is therefore protected to the greatest possible extent, since the brake device responds immediately when actuated, either by the contact of the operator's hand, or on occurrence of an uncontrolled acceleration.

Further advantageous features of the invention can be gathered from the subclaims; that embodiment is more particularly advantageous in which the brake device has a brake force limiting device. Due to the resilient construction of the two brake band articulation places in relation to one another, a brake force retardation is achieved, and the considerable tensile forces occurring during braking are reduced.

DESCRIPTION OF DRAWINGS

The invention is illustrated by way of example in the drawings, wherein

FIG. 2 is a side elevation of the brake device with the safety device, FIG. 3 is a side elevation of a variant embodiment of the safety device for the brake device, FIG. 4 is a side elevation of a brake system which has a lever system co-operating with the band of a band brake, FIG. 5 is a diagrammatic side elevation of the brake device illustrated in FIG. 4 in the braking position, FIG. 6 is a diagrammatic view of the brake device illustrated in FIG. 4 in the inoperative position, FIG. 7 is a diagrammatic side elevation of the brake device with a further variant embodiment of a resilient system interconnecting the two brake band articulation places.

DETAILED DESCRIPTION OF PREFERRED EMBODIMENTS

Figure 1:
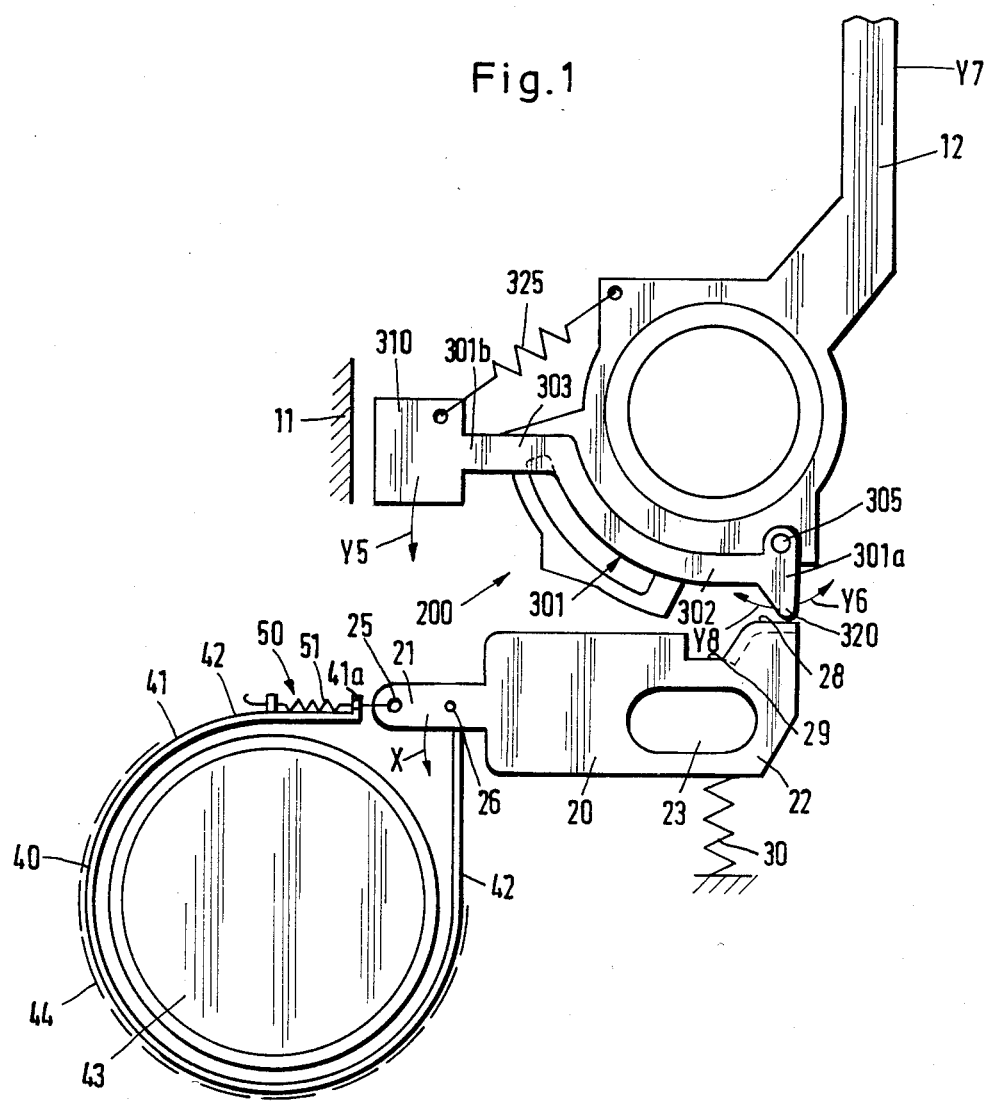
FIG. 1 is a side elevation of a lever system co-operating with the band of a band brake, and also of a brake device having a safety device.

The embodiment illustrated in FIG. 1 has a casing 11 of a known chain saw (not shown) having a brake device and a safety device 200 for braking the saw chain.

The brake device comprises a hand guard lever 12, which is pivotably mounted on the casing 11 of the chain saw, a locking lever 301, which is pivotably mounted on the hand guard lever 12, and a brake lever 20 which co-operates with the locking lever 301 and to whose end 21 a brake band is attached with its two brake band ends 41, 42 of the band brake. Of the two ends 41, 42 of the brake band 40, the brake band end 41 is pivotably attached in the end zone 21 of the brake lever 20 to an articulating pin 25 rigidly connected thereto, while the other end 42 of the brake band 40 is pivotably attached to an articulating pin 26 disposed on the brake lever 20 adjacent the articulating pin 25 for the brake ban end 41. The two articulating pins 25, 26 are disposed spaced-out in one plane (FIG. 1). In addition to arranging the two articulating pin 25,26 in a plane extending parallel with the longitudinal direction of the brake lever 20, it is also possible to arrange the two articulating pins 25,26 attached lying spaced-out and offset in relation to one another to the brake lever end 21.

Preferably the brake ban 40 is guided in a guide 44 in a portion of the peripheral zone of a clutch drum 43 (FIG. 1).

In the embodiment illustrated in FIGS. 1 and 2, a safety device 200 connected to the brake device comprises a one-armed locking lever 301 pivotably retained on the hand guard lever 12 by one end 301a at a place 305. The other free end 301b of the locking lever 301 bears a mass member 310. The free end 301b of the locking lever 301 is also under the force of a spring 325 which retains the brake lever to its starting position after the hand guard lever has been triggered. The spring 325 is attached to the hand guard lever 12.

In the embodiment illustrated in FIGS. 1 and 2 the locking lever 301 has an arm portion 302 which extends in an arc of a circle, and an adjoining, horizontally extending portion 303 which bears the mass member 310 at its free end.

The free end 301a of the locking lever 301, which is pivotably mounted on the hand guard lever 12 at the place 305, merges in a control cam 320 which extends in the direction of the brake lever 20 and is operatively connected thereto. The free end of the control cam 320 acts on the end 22 of the brake lever 20 in the zone of a guideway (slideway) 28 which passes into a recess 29.

The brake lever 20 can consist of a two-part or multipart lever system, and has an oblong hole 23 which extends in the longitudinal direction of the brake lever 20 and receives and guides a control pin (not shown), so that when the brake lever 20 is actuated, the end 21 of the brake lever 20 can be so moved into an angular position that the brake band 40 can be applied to the clutch drum 43. In the embodiment illustrated in FIG. 1 the end 22 of the brake lever 20 is connected to a spring element 30, so that the brake lever 20 can be moved into its required angular position for the braking operation.

The control cam 320 of the locking lever 301 is so operatively connected to the brake lever 20 that, when the locking lever 301 with its mass member 310 is moved out of the starting position, shown in FIGS. 1 and 2, in the direction indicated by the arrow Y5, the control cam 320 is moved in the direction indicated by the arrow Y6 and therefore releases the brake lever 20, so that braking is performed. The fact is that when the hand guard lever 12 moves in the direction indicated by arrow Y7, the free end of the control cam 320 of the locking lever 301 slides into the recess 29 in the guideway 28 on the top edge of the brake lever 20, so that by means of the corresponding device 30 the brake lever 20 is pivoted by its free end 21 in the direction indicated by arrow X, the two articulating pins 25,26 with the brake band ends being moved offset in relation to one another, so that the brake band 40 is applied to the clutch drum 43 and braking is peformed. During the braking operation the brake band 40 is applied to the drum 43 and the braking operation is triggered by the resulting friction.

In the lifted condition, the brake lever 20 with the brake band 40 is fixed by a double-lever system, comprising the hand guard lever 12 and the locking lever 301. The pivot of the hand guard lever 12 is secured to the casing, while the pivot of the locking lever 301 is on the hand guard lever 12.

The brake lever 20 is triggered as follows: the hand guard lever 12 is moved forward in the direction indicated by arrow Y7. The force of inertia Y5 of the mass member 310 causes a movement of the control cam 320 in the direction Y6, without the hand guard lever 12 altering its position.

The brake lever 20 is returned to its starting position as follows: After the hand guard lever has been triggered, the spring 325 moves the locking lever 301 against a stop (not shown) on the disengaging lever and moves the latter to the hand guard lever 12 to the starting position. When the hand guard lever 12 is pulled back, the control cam 320 forces the brake lever 20 into its starting position shown in FIGS. 1 and 2. After automatic triggering, the hand guard lever 12 must be disengaged in the forward direction. In that case the spring 325 moves the locking lever 301 against the stop (not shown) on the disengaging lever and moves the latter to the hand guard lever 12 into the starting position shown in FIGS. 1 and 2. When the hand guard lever 12 is returned, the control cam 320 forces the brake lever 20 into its starting position shown in FIGS. 1 and 2.

While in the embodiment illustrated in FIGS. 1 and 2 the control cam 320 is a solid component of the locking lever 301, in the embodiment illustrated in FIG. 3 the locking lever 301 with its control cam 320 is constructed in two parts—i.e., the locking lever 301 and the control cam 320 form two parts which are operatively interconnected. The control cam 320 takes the form of a one-armed lever 321 and is pivotally mounted by its free end 32a at a place 305a on the hand guard lever 12. The other free end of the one-armed control cam lever acts on the brake lever 20. The locking lever 301 is also pivotally mounted at a place 305b on the hand guard lever and bears, in accordance with the embodiment illustrated in FIGS. 1 and 2, a mass member 310 at its free end 301b, while the front end 301a of the locking lever 301 acts on the one-armed control cam lever 321, so that when the hand guard lever 12 is actuated in the direction of the arrow Y7, the force of inertia Y5 of the mass member 301 causes a movement of the one-armed control cam lever 321 in the direction Y6, without the hand guard lever 12 altering its position.

Moreover, the brake device in the embodiment illustrated in FIG. 1 has a force-limiting device 50 which in the embodiment illustrated comprises a spring element 51 which is attached to the articulation point 25 of the brake lever 20 and which extends by its end adjacent the articulating point 25 through the end 41a of the brake band 40, the other end of the spring element 51 being rigidly connected to the brake band 40. The two-part construction of the locking lever 301 shown in FIG. 3 gives the advantage of a compact construction and the possibility of making the mass member (triggering weight) smaller.

In the embodiment of a brake device illustrated in FIGS. 4 to 6, the hand guard lever 12 pivotably mounted in a chain saw casing takes the form of a toggle lever with a longer lever arm 211 and a shorter lever arm 212. The hand guard lever 12 is mounted to pivot via its shorter lever arm 212 around a pin 216 which is fixed to the chain saw casing and is also the articulation point for the hand guard lever 12. The pin 216 extends in an oblong hole 215 in the end zone 212a of the lever arm 212 of the hand guard lever 12. The oblong hole 215 is constructed to extend substantially parallel with the longitudinal axis of the lever arm 212 (FIG. 4).

The hand guard lever 12 is operatively connected after the fashion of a toggle lever system to a brake lever 220 which is articulated via a control pin 213 to the actuating lever 12. The guide pin 213 is guided at one end in an oblong hole 223 in the end zone 231 of the brake lever 220. The oblong hole 223 is constructed in the control lever to extend substantially parallel with the longitudinal axis of the brake lever 220. Adjacent the end 231 of the brake lever 220 the oblong hole 223 has a chamfered surface, indicated at a place 213a. The control pin 213 has a chamfered matching surface 213a. When the brake device is in the inoperative position (FIG. 8), the chamfered surface 213a of the control pin 213 acts on the chamfered surface 223a of the oblong hole 223 in the control lever 220.

The other end of the control pin 213 is guided in an oblong hole 230 which is formed in the hand guard lever 12 in the zone 214 connecting the lever arm 211 and the lever arm 212. The oblong hole 230, which extends substantially parallel with the longitudinal axis of the longer lever arm 211, has two offset guide portions, namely an upper portion 231, and a lower portion, offset laterally from the upper portion 231. When the brake device occupies the inoperative position (FIG. 6), the control pin 213 is in the upper oblong hole portion 231, while in the braking position the control pin 213 is in the lower oblong hole portion (FIG. 5).

Articulated to pivot at a place 25 at the free end 221 of the brake lever 220 is one end for one of a brake ban 40, which is pivotably attached by its other end 42 at a place 226 on the brake lever 220 at a distance from the articulation place 225 of the other brake ban end 41. The brake band 40 is guided over the brake drum 43 which is disposed on the drive shaft for the saw chain.

The free end 231 of the brake lever 220 is connected to a bowed spring 260 attached by its other end to the end 212a of the lever arm 212 of the hand guard lever 12.

As can be seen in FIG. 4, the brake lever 220 with its two brake band articulation places 225, 226 so constructed that the two brake band articulation places are interconnected via a resilient system for brake force limitation. For this purpose in the embodiment illustrated in FIG. 4 the brake band 40 is connected via tension or compression springs 400, 401 to the brake lever 220. The tension or compression springs 400, 401 are connected to the brake lever 220 between the brake band ends and their articulation places, so that when the brake is actuated, with the aid of the springs the tensile are reduced. The compression or tension springs are so arranged and constructed that a reduction in tensile force takes place when the brake band is actuated.

In the embodiment illustrated in FIG. 7, articulated to the brake lever 220 at a place 225 on the free end 221 of the brake lever 220 is a further lever 405 to whose free end 405a the brake band 40 is articulated. This second lever 405 is operatively connected to a tension spring 406. To reduce the tensile forces occurring, a correspondingly arranged compression spring can also be used for the lever 405.

Figure 8:
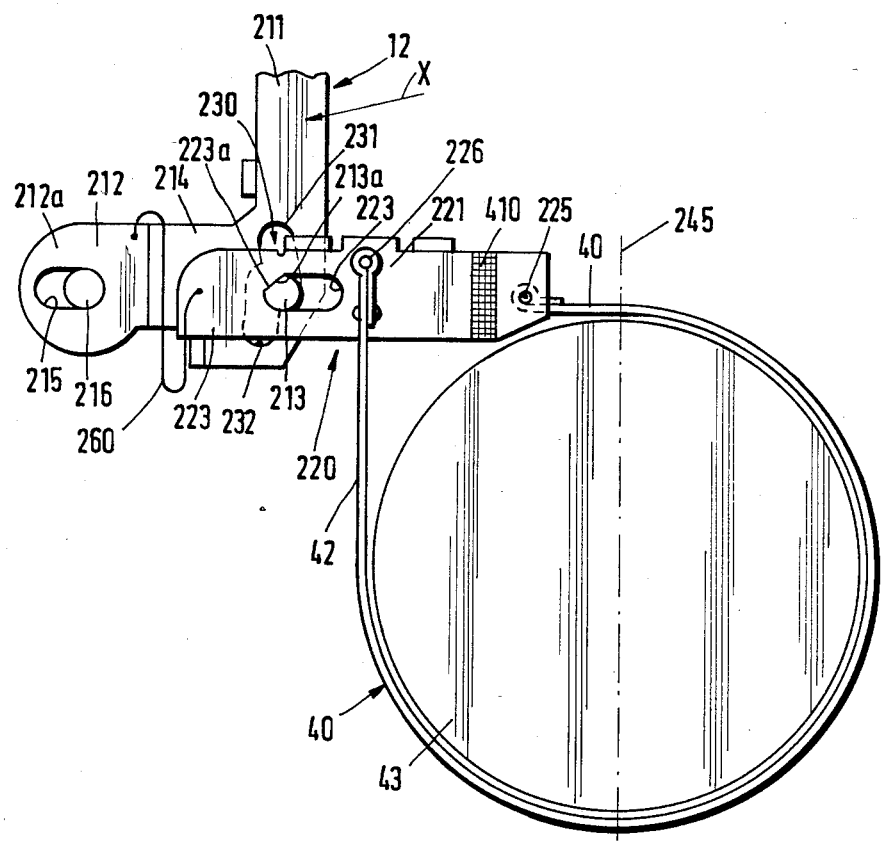
FIG. 8 is a diagrammatic side elevation of an embodiment of a brake device, in which the brake lever bearing the brake band ends constructed in two parts, its parts being interconnected via a resilient system.

FIG. 8 shows a further embodiment of a resilient system. A brake lever 200 is constructed separately adjacent of the brake lever longitudinal direction, between its two brake band articulation places 225,226. The two portions of the brake lever 220 bearing the brake band articulating places 225, 226 are in that case interconnected via a resilient element 410 so constructed as to reduce tensile force in this case also.

The brake device illustrated in FIGS. 4 and 6 operates as follows: In the inoperative position the brake lever 220 adopts a substantially horizontal position, the control pin 213 being in the left-hand zone of the oblong hole 223 on the one hand, and in the zone of the upper portion 231 of the oblong hole 230. In this inoperative position the brake lever 220 is retained by means of the spring 260 (FIG. 6).

However, if the brake device is triggered by the movement of the hand guard lever 12 in the direction of arrow X (FIG. 5), the pivoting movement of the hand guard lever 12 pivots the brake lever 260 into the position shown in FIG. 5; this is done by the control pin 213 being constrainedly guided from the upper oblong hole portion 231 into the lower oblong hole portion 232 so that the hand guard lever 12 and the brake lever 220 occupy an angular position in relation to one another, as a result of which the brake band 40 is applied to the brake drum 43 and braking takes place by friction.

Advantageously the articulating points 225, 226 of the brake band 41 at the end of the brake lever 220 are so offset in relation to one another that the articulating place 226 of the brake band 42 comes to lie above the other articulating place 225 of the other brake band end 41, so that a high braking force is achieved even with a small angular position of the brake lever 220. The considerable tensile forces which would otherwise have to be produced are reduced by the interposed resilient system.

The embodiment of a brake device illustrated in FIGS. 4 to 8 also has a safety device, corresponding to the embodiment illustrated in FIGS. 1 to 3.

What is claimed is:

1. A brake device for braking the saw chain of a portable motor-driven chain saw, having a senser, which responds when a dangerous situation occurs, and a driving chain wheel comprising a casing, a pivotable hand guard lever which is pivotably retained on said casing and can be brought into contact with the operator's hand if the saw makes a slipping movement, a friction brake having a brake band with two ends actuated by movement of said hand lever, said friction brake being in operative connection with said hand guard lever, a drum acted upon by said friction brake connected to said driving chain wheel of said chain saw and having a safety device which, if an uncontrolled acceleration of the rotating saw chain takes place, actuates said friction brake, a brake lever having defined thereon a guideway and a recess, a lever-like device connecting said hand guard lever to said brake lever, said brake lever having a free end with said two ends of said brake band pivotably articulated thereon at a distance from one another, actuation means for moving said brake lever when in the braking position into an angular position, while at the same time the two places of brake band articulation change their positions in relation to one another, and the brake band is applied to the brake drum; said safety device consisting of a locking lever which is pivotably mounted on said hand guard lever and bears a mass member at its free sprung end, said locking lever bearing at its end remote from the end bearing said mass member a control cam which bears against said brake lever and is so operatively connected thereto whereby said control cam can be transferred over said guideway of said brake lever into said recess therein to trigger the braking operation.

2. A brake device according to claim 1 wherein the locking lever is retained by its end bearing the control cam via the pivot on the hand guard lever.

3. A brake device according to claim 1, wherein the locking lever with the control cam is constructed in two parts, the control cam in the form of a one-armed lever being retained by one end on the hand guard lever via the pivot, the locking lever being disposed pivotably via the pivot on the hand guard lever and being operatively connected by its end remote from the end bearing the mass member to the control cam.

4. A brake device according to claim 1 or 3, wherein the locking lever has an arm portion extending in the form of a segment of a circle, and an adjoining, horizontally extended portion which bears the mass member.

5. A brake device according to claim 1, wherein the brake device has a brake force limiting device.

6. A brake device according to claim 5 wherein the brake force limiting device comprises a spring element which is attached to the place of articulation of the brake lever and which extends by its end adjacent the place of articulation through the end of the brake band, the other end of the spring element being rigidly connected to the brake band.

* * * * *